(12) United States Patent
Lindores et al.

(10) Patent No.: US 8,731,836 B2
(45) Date of Patent: May 20, 2014

(54) WIDE-AREA AGRICULTURAL MONITORING AND PREDICTION

(71) Applicants: Robert J Lindores, Christchurch (NZ); Ted E Mayfield, Ukiah, CA (US); Morrison Ulman, Los Altos, CA (US)

(72) Inventors: Robert J Lindores, Christchurch (NZ); Ted E Mayfield, Ukiah, CA (US); Morrison Ulman, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 14/109,003

(22) Filed: Dec. 17, 2013

(65) Prior Publication Data
US 2014/0107957 A1    Apr. 17, 2014

Related U.S. Application Data

(63) Continuation of application No. 12/911,046, filed on Oct. 25, 2010, now abandoned.

(51) Int. Cl.
*G01D 18/00* (2006.01)
*G01V 3/38* (2006.01)

(52) U.S. Cl.
USPC ................................................. 702/2; 702/82

(58) Field of Classification Search
CPC ... A01B 79/005; G06K 9/0063; A01C 21/007
USPC ........................ 702/2, 3, 5, 188; 382/110, 195
See application file for complete search history.

(56) References Cited

U.S. PATENT DOCUMENTS

| | | |
|---|---|---|
| 5,003,329 A | 3/1991 | Itabashi |
| 5,087,916 A | 2/1992 | Metzdorff et al. |
| 5,103,250 A | 4/1992 | Arifuku et al. |
| 5,247,356 A | 9/1993 | Ciampa |
| 5,427,356 A | 6/1995 | Krotov et al. |
| 5,506,644 A | 4/1996 | Suzuki et al. |
| 5,517,419 A | 5/1996 | Lanckton et al. |
| 5,581,299 A | 12/1996 | Raney |
| 5,596,494 A | 1/1997 | Kuo |
| 5,633,946 A | 5/1997 | Lachinski et al. |
| 5,646,207 A | 7/1997 | Schell |
| 5,689,742 A | 11/1997 | Chamberlain |
| 5,719,773 A | 2/1998 | Choate |
| 5,768,640 A | 6/1998 | Takahashi et al. |
| 5,845,161 A | 12/1998 | Schrock et al. |
| 5,897,728 A | 4/1999 | Cole et al. |

(Continued)

FOREIGN PATENT DOCUMENTS

| | | |
|---|---|---|
| JP | 2004073203 | 3/2004 |
| JP | 2007024859 | 2/2007 |
| JP | 2010068719 | 4/2010 |

OTHER PUBLICATIONS

A. W. M. Verkroost and M. J. Wassen, "A Simple Model for Nitrogen-limited Plant Growth and Nitrogen Allocation", Annals of Botany 96: 871-876, 2005, Oxford University Press.

(Continued)

*Primary Examiner* — Sujoy Kundu
*Assistant Examiner* — Ricky Ngon
(74) *Attorney, Agent, or Firm* — NUPAT, LLC; Morrison Ulman

(57) ABSTRACT

Ground-based measurements of agricultural metrics such as NDVI are used to calibrate wide-area aerial measurements of the same metrics. Calibrated wide-area data may then be used as an input to a field prescription processor.

28 Claims, 6 Drawing Sheets

(56) References Cited

U.S. PATENT DOCUMENTS

| | | | |
|---|---|---|---|
| 5,902,347 A | 5/1999 | Backman et al. |
| 5,913,078 A | 6/1999 | Kimura et al. |
| 5,922,939 A | 7/1999 | Cota |
| 5,966,122 A | 10/1999 | Itoh |
| 5,969,243 A | 10/1999 | Frey et al. |
| 5,991,690 A | 11/1999 | Murphy |
| 6,009,359 A | 12/1999 | El-Hakim et al. |
| 6,070,682 A | 6/2000 | Isogai et al. |
| 6,076,917 A | 6/2000 | Wen |
| 6,085,135 A | 7/2000 | Steckel |
| 6,128,446 A | 10/2000 | Schrock et al. |
| 6,141,614 A | 10/2000 | Janzen |
| 6,185,990 B1 | 2/2001 | Missotten et al. |
| 6,205,397 B1 | 3/2001 | Eslambolchi et al. |
| 6,222,985 B1 | 4/2001 | Miyake et al. |
| 6,282,362 B1 | 8/2001 | Murphy et al. |
| 6,337,951 B1 | 1/2002 | Nakamura |
| 6,346,980 B1 | 2/2002 | Tani et al. |
| 6,393,927 B1 | 5/2002 | Biggs et al. |
| 6,401,069 B1 | 6/2002 | Boys et al. |
| 6,504,571 B1 | 1/2003 | Narayanaswami et al. |
| 6,529,615 B2 | 3/2003 | Hendrickson et al. |
| 6,574,561 B2 | 6/2003 | Alexander et al. |
| 6,597,818 B2 | 7/2003 | Kumar et al. |
| 6,690,883 B2 | 2/2004 | Pelletier |
| 6,691,135 B2 | 2/2004 | Pickett et al. |
| 6,732,162 B1 | 5/2004 | Wood et al. |
| 6,741,948 B2 | 5/2004 | Hauger et al. |
| 6,802,205 B2 | 10/2004 | Barguirdjian et al. |
| 6,868,340 B2 | 3/2005 | Alexander et al. |
| 6,917,206 B2 | 7/2005 | Rains et al. |
| 6,975,942 B2 | 12/2005 | Young et al. |
| 6,993,196 B2 | 1/2006 | Sun et al. |
| 7,106,328 B2 | 9/2006 | Royan |
| 7,167,187 B2 | 1/2007 | Scott et al. |
| 7,191,056 B2 | 3/2007 | Costello et al. |
| 7,234,106 B2 | 6/2007 | Simske |
| 7,248,285 B2 | 7/2007 | Needham |
| 7,248,968 B2 | 7/2007 | Reid |
| 7,283,975 B2 | 10/2007 | Broughton |
| 7,313,604 B2 | 12/2007 | Wood et al. |
| 7,411,493 B2 | 8/2008 | Smith |
| 7,465,323 B2 | 12/2008 | Au et al. |
| 7,466,244 B2 | 12/2008 | Kimchi |
| 7,482,973 B2 | 1/2009 | Tucker et al. |
| 7,508,840 B2 | 3/2009 | Delaney |
| 7,516,563 B2 | 4/2009 | Koch |
| 7,541,975 B2 | 6/2009 | Sever et al. |
| 7,617,246 B2 | 11/2009 | Koch et al. |
| 7,634,380 B2 | 12/2009 | Martin et al. |
| 7,658,096 B2 | 2/2010 | Pinto et al. |
| 7,664,233 B1 | 2/2010 | Kirchmeier et al. |
| 7,720,703 B1 | 5/2010 | Broughton |
| 7,724,130 B2 | 5/2010 | Norstrom et al. |
| 7,739,138 B2 | 6/2010 | Chauhan et al. |
| 7,766,547 B2 | 8/2010 | Weppenaar et al. |
| 7,813,741 B2 | 10/2010 | Hendrey et al. |
| 7,848,865 B2 | 12/2010 | Di Federico et al. |
| 7,872,669 B2 | 1/2011 | Darrell et al. |
| 8,105,720 B2 | 1/2012 | Koenig et al. |
| 8,131,118 B1 | 3/2012 | Jing et al. |
| 8,265,835 B2 | 9/2012 | Peterson et al. |
| 8,319,165 B2 * | 11/2012 | Holland ............ 250/206.1 |
| 8,504,252 B2 | 8/2013 | Hamilton et al. |
| 2002/0120424 A1 | 8/2002 | Hauger et al. |
| 2003/0182260 A1 | 9/2003 | Pickett et al. |
| 2003/0187560 A1 | 10/2003 | Keller et al. |
| 2004/0100285 A1 | 5/2004 | Rains et al. |
| 2004/0168148 A1 | 8/2004 | Goncalves et al. |
| 2004/0203571 A1 | 10/2004 | Hashizume |
| 2004/0225444 A1 | 11/2004 | Young et al. |
| 2005/0034062 A1 | 2/2005 | Bufkin et al. |
| 2005/0209815 A1 | 9/2005 | Russon et al. |
| 2005/0223337 A1 | 10/2005 | Wheeler et al. |
| 2006/0061595 A1 | 3/2006 | Goede et al. |
| 2006/0095207 A1 | 5/2006 | Reid |
| 2006/0217105 A1 | 9/2006 | Kumar |
| 2007/0010924 A1 | 1/2007 | Otani et al. |
| 2007/0076920 A1 | 4/2007 | Ofek |
| 2008/0125920 A1 | 5/2008 | Miles et al. |
| 2008/0191054 A1 | 8/2008 | Di Federico et al. |
| 2008/0258881 A1 | 10/2008 | Manson et al. |
| 2008/0258967 A1 | 10/2008 | Manson et al. |
| 2008/0261627 A1 | 10/2008 | Manson et al. |
| 2008/0262727 A1 | 10/2008 | Manson et al. |
| 2008/0262733 A1 | 10/2008 | Manson et al. |
| 2008/0262734 A1 | 10/2008 | Manson et al. |
| 2008/0263097 A1 | 10/2008 | Manson et al. |
| 2008/0263174 A1 | 10/2008 | Manson et al. |
| 2008/0284587 A1 | 11/2008 | Saigh et al. |
| 2008/0304711 A1 | 12/2008 | Scharf et al. |
| 2009/0132132 A1 | 5/2009 | Peterson et al. |
| 2009/0136788 A1 | 5/2009 | Koenig et al. |
| 2010/0100540 A1 | 4/2010 | Davis et al. |
| 2010/0250136 A1 | 9/2010 | Chen |
| 2010/0274657 A1 | 10/2010 | Workman et al. |
| 2010/0277185 A1 | 11/2010 | Hughes |
| 2010/0306012 A1 | 12/2010 | Zyskowski et al. |
| 2011/0064312 A1 | 3/2011 | Janky et al. |
| 2011/0181610 A1 | 7/2011 | Baggs et al. |
| 2011/0282578 A1 | 11/2011 | Miksa et al. |
| 2012/0200697 A1 | 8/2012 | Wuestefeld et al. |
| 2012/0255354 A1 | 10/2012 | Fu et al. |

OTHER PUBLICATIONS

International Search Report and Written Opinion of the International Searching Authority in PCT/US2011/053547, Mar. 26, 2012.

Espacenet abstract for JP 2004 073203.

Espacenet abstract for JP 2010 068719.

Pawelka, Elizabeth "Make your 3270 applications accessible from PDAs and cell phones", CCR2: A Publication for the IBM System z Software Community, Issue 6., (2008).

Gruen, Armin et al., "Algorithms for Automated Extraction of Man-Made Objects from Raster Image Data in a GIS", Institute of Geodesy & Photogrammetry, Swiss Federal Institute of Technology, 1994.

"UpNext: 3D Local Search and Community.", www.upnext.com, (2009).

"You City", www.youcity.com, (2009).

Agrios, Bronwyn et al., "Get in Touch with Volunteered Geographic Information", ArcUser www.esri.com, (Summer 2010),50-55.

Qtaishat, K. S., "Assessing the Performance of Different Direct-Georeferencing Strategies", Institute of Engineering Surveying and Space Geodesy, University of Nottingham, ASPRS 2006 Annual Congference, Reno, NV,(May 2006).

Schwarz, Klaus-Peter "Aircraft Position and Attitude Determination by GPS and INS", International Archives of Photogrammetry and Remote Sensing, vol. XXXI, Part B6, Vienna., (1996).

Mostafa, Mohamed M., "Digital Image Georeferencing From a Multiple Camera Source by GNS/INS", ISPRS Journal of Photogrammetry and Remote Sensing, vol. 56, Issue 1, (Jun. 2001).

"PCT International Search Report and Written Opinion", PCT/US2012/061681, Apr. 22, 2013.

Saha, S. K., "Water and Wind Induced Soil Erosion Assessment and Monitoring Using Remote Sensing and GIS", Proceedings of a Training Workshop, Dehra Dun, India, Jul. 7-11, 2003, 315-330.

\* cited by examiner

WIDE-AREA AGRICULTURAL MONITORING AND PREDICTION

RELATED APPLICATIONS

This application is a continuation of "Wide-area agricultural monitoring and prediction", U.S. Ser. No. 12/911,046, filed on Oct. 25, 2010.

TECHNICAL FIELD

The disclosure is related to monitoring and prediction of agricultural performance over wide areas.

BACKGROUND

A modern crop farm may be thought of as a complex biochemical factory optimized to produce corn, wheat, soybeans or countless other products, as efficiently as possible. The days of planting in spring and waiting until fall harvest to assess results are long gone. Instead, today's best farmers try to use all available data to monitor and promote plant growth throughout a growing season. Farmers influence their crops through the application of fertilizers, growth regulators, harvest aids, herbicides and pesticides. Precise crop monitoring—to help decide quantity, location and timing of field applications—has a profound effect on cost, crop yield and pollution.

Normalized difference vegetative index (NDVI) is an example of a popular crop metric. NDVI is based on differences in optical reflectivity of plants and dirt at different wavelengths. Dirt reflects more visible (VIS) red light than near-infrared (NIR) light, while plants reflect more NIR than VIS. Chlorophyll in plants is a strong absorber of visible red light; hence, plants' characteristic green color.

$$NDVI = \frac{r_{NIR} - r_{VIS}}{r_{NIR} + r_{VIS}},$$

where r is reflectivity measured at the wavelength indicated by the subscript. Typically, NIR is around 770 nm while VIS is around 660 nm. In various agricultural applications, NDVI correlates well with biomass, plant height, nitrogen content or frost damage.

Farmers use NDVI measurements to decide when and how much fertilizer to apply. Early in a growing season it may be hard to gauge how much fertilizer plants will need over the course of their growth. Too late in the season, the opportunity to supply missing nutrients may be lost. Thus the more measurements are available during a season, the better.

A crop's yield potential is the best yield obtainable for a particular plant type in a particular field and climate. Farmers often apply a high dose of fertilizer, e.g. nitrogen, to a small part of a field, the so-called "N-rich strip". This area has enough nitrogen to ensure that nitrogen deficiency does not retard plant growth. NDVI measurements on plants in other parts of the field are compared with those from the N-rich strip to see if more nitrogen is needed to help the field keep up with the strip.

The consequences of applying either too much or too little nitrogen to a field can be severe. With too little nitrogen the crop may not achieve its potential and profit may be left "on the table." Too much nitrogen, on the other hand, wastes money and may cause unnecessary pollution during rain runoff. Given imperfect information, farmers tend to over apply fertilizer to avoid the risk of an underperforming crop. Thus, more precise and accurate plant growth measurements save farmers money and prevent pollution by reducing the need for over application.

NDVI measurements may be obtained from various sensor platforms, each with inherent strengths and weaknesses. Satellite or aerial imaging can quickly generate NDVI maps that cover wide areas. However, satellites depend on the sun to illuminate their subjects and the sun is rarely, if ever, directly overhead a field when a satellite acquires an image. Satellite imagery is also affected by atmospheric phenomena such as clouds and haze. These effects lead to an unknown bias or offset in NDVI readings obtained by satellites or airplanes. Relative measurements within an image are useful, but comparisons between images, especially those taken under different conditions or at different times, may not be meaningful.

Local NDVI measurements may be obtained with ground based systems such as the Trimble Navigation "GreenSeeker". A GreenSeeker is an active sensor system that has its own light source that is scanned approximately one meter away from plant canopy. The light source is modulated to eliminate interference from ambient light. Visible and near-infrared reflectivity are measured from illumination that is scanned over a field. Ground-based sensors like the GreenSeeker can be mounted on tractors, spray booms or center-pivot irrigation booms to scan an entire field. (GreenSeekers and other ground-based sensors may also be hand-held and, optionally, used with portable positioning and data collection devices such as laptop computers, portable digital assistants, smart phones or dedicated data controllers.) Active, ground-based sensors provide absolute measurements that may be compared with other measurements obtained at different times, day or night. It does take time, however, to scan the sensors over fields of interest.

What is needed are wide area plant monitoring systems and methods capable of providing absolute data that can be compared with other data obtained by different methods and/or at different times. Furthermore, farmers need help navigating the vast stores of potentially valuable data that affect plant growth.

DETAILED DESCRIPTION

Wide-area agricultural monitoring and prediction encompasses systems and methods to generate calibrated estimates of plant growth and corresponding field prescriptions. Data from ground and satellite based sensors are combined to obtain absolute, calibrated plant metrics, such as NDVI, over wide areas. Further inputs, such as soil, crop characteristics and climate data, are stored in a database. A processor uses the measured plant metrics and database information to create customized field prescription maps that show where, when and how much fertilizer, pesticide or other treatment should be applied to a field to maximize crop yield.

Ground data are used to remove the unknown bias or offset of satellite or aerial images thereby allowing images taken at different times to be compared with each other or calibrated to an absolute value. Soil, crop and climate data may also be stored as images or maps. The volume of data stored in the database can be quite large depending on the area of land covered and the spatial resolution. Simulations of plant growth may be run with plant and climate models to build scenarios such that a farmer can predict not just what may happen to his crops based on average assumptions, but also probabilities for outlying events.

Figure 1:
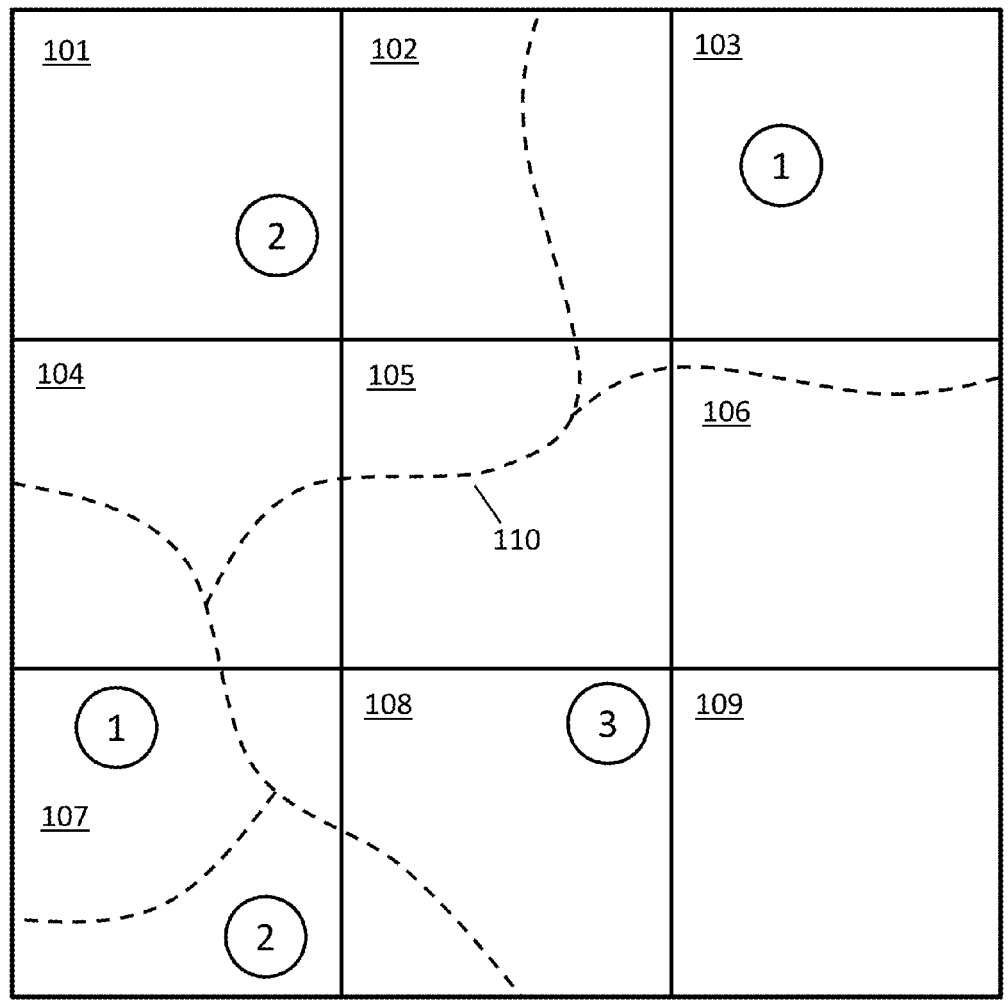
FIG. 1 shows a schematic map of nine farm fields with management zones.

A basic ingredient of any field prescription, however, is an accurate map of actual plant progress measured in the field. NDVI is used here as a preferred example of a metric for measuring plant growth; however, other parameters, such as the green vegetation index, or other reflectance-based vegetative indices, may also be useful. FIG. 1 shows a schematic map of nine farm fields, 101, 102 . . . 109, delineated by solid boundary lines. Dashed lines in the figure show the boundaries of field management zones which are labeled by circled numbers 1, 2 and 3. Management zones are areas of common growing characteristics. Qualities that define a zone may include drainage, soil type, ground slope, naturally occurring nutrients, weed types, pests, etc. Regardless of how zones differ, plants within a zone tend to grow about the same. Targeted fertilizer application within a zone can help smooth out growth variation. Plants in different zones may require markedly different fertilizer prescriptions.

Figure 2:
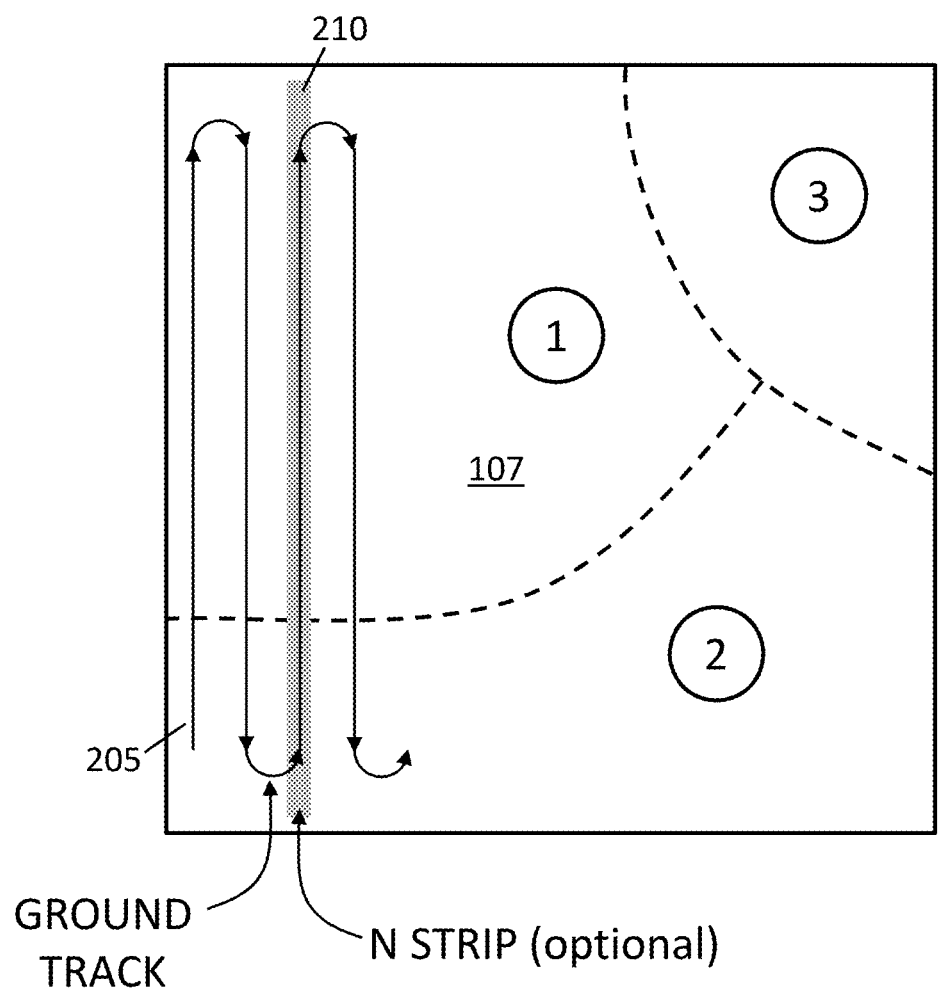
FIG. 2 shows one of the fields of FIG. 1 in greater detail.

FIG. 2 shows field 107 of FIG. 1 in greater detail. The field overlaps three management zones labeled by circled numbers 1, 2 and 3. Path 205 shows the track that a ground-based NDVI scanner like a GreenSeeker takes as it measures plant growth in the field. Ground-based scanners can be deployed on tractors, spray trucks or other equipment and can be programmed to record data whenever the equipment moves over a growing area. (Ground-based scanners may also be handheld and connected to portable data collection and/or positioning equipment.) Ground-based scanners are often used for real-time, variable-rate application, but because the scanners are automated, they can run any time, not just during fertilizer application.

In FIG. 2, gray stripe 210 marks the location of an N-rich strip. The N-rich strip is an area where an excess of nitrogen fertilizer has been applied. Plant growth in the N-rich strip is not limited by the availability of nitrogen, so those plants exhibit the maximum yield potential of similar plants in the field. Because N-rich strips are useful for yield potential calculations, measurement of NDVI in an N-rich strip is often part of a real-time, variable-rate application procedure. N-rich strips are not always needed, however. The performance of the top 10% of plants in a representative part of a field may provide an adequate standard for maximum yield potential, for example.

Figure 3:
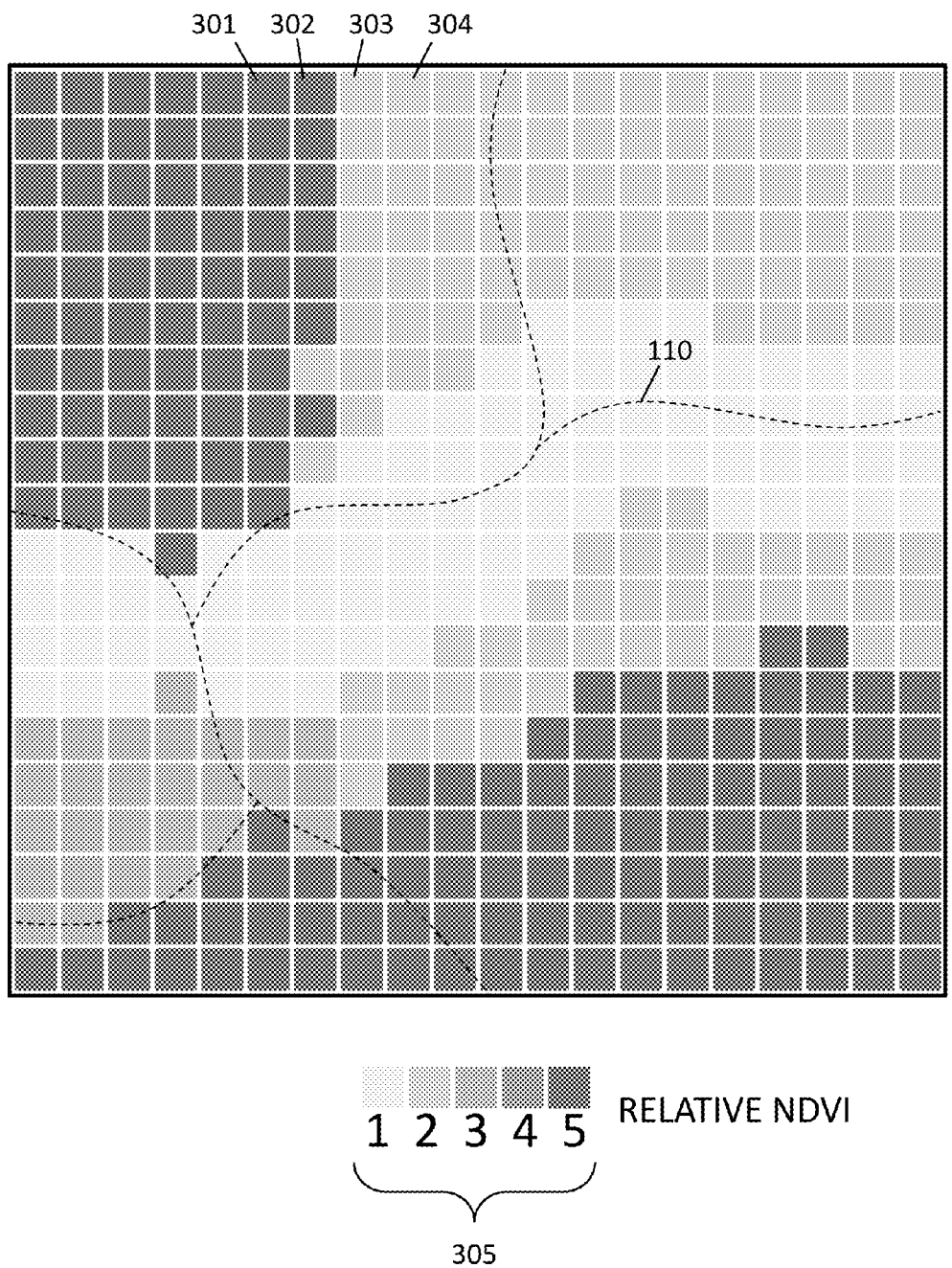
FIG. 3 shows a schematic satellite image of the fields of FIG. 1.

FIG. 3 shows a schematic satellite image of the fields of FIG. 1. The area of land illustrated in FIG. 3 is the same as the area shown in FIG. 1. The land in FIG. 3 has been divided into pixels (e.g. 301, 302, 303, 304) similar to those that may be obtained by satellite imaging. FIG. 3 is drawn for purposes of illustration only; it is not to scale. Pixels in an actual satellite image may represent areas in the range of roughly 1 $m^2$ to roughly 100 $m^2$. The resolution of today's satellite images is suitable for agricultural purposes; it is no longer a limiting factor as was the case several years ago.

Scale 305 in FIG. 3 is a schematic representation of an NDVI scale. Darker pixels represent higher values of NDVI. Although only five relative NDVI levels are shown in FIG. 3, much higher precision is available from actual satellite images. Actual satellite images, however, do not provide absolute NDVI with the high accuracy available using ground-based sensors. Variations in lighting (i.e. position of the sun), atmospheric effects (e.g. clouds, haze, dust, rain, etc.), and satellite position all introduce biases and offsets that are difficult to quantify.

It is apparent that NDVI measurements for the set of fields shown in FIGS. 1 and 3 may be obtained by either ground or satellite sensors. Ground measurements provide absolute NDVI at high accuracy while satellite measurements provide relative NDVI over wide areas. When ground and satellite data are available for a common area at times that are not too far apart, the ground data may be used to resolve the unknown bias or offset in the satellite data. As an example, if field 107 in FIG. 1 is measured by a GreenSeeker scan and fields 101 through 109 (including 107) are measured by satellite imaging, then overlapping ground and satellite data for field 107 can be used to calibrate the satellite data for all of the fields. The accuracy of ground-based data has been extended to a wide area. Generally "times that are not too far apart" are within a few days of one another; however, the actual maximum time difference for useful calibration depends on how fast plants are growing. Measurements must be closer together in time for fast-growing crops. Methods to estimate plant growth rate and extend the amount by which ground and satellite measurements can be separated in time are discussed below.

Figure 4:
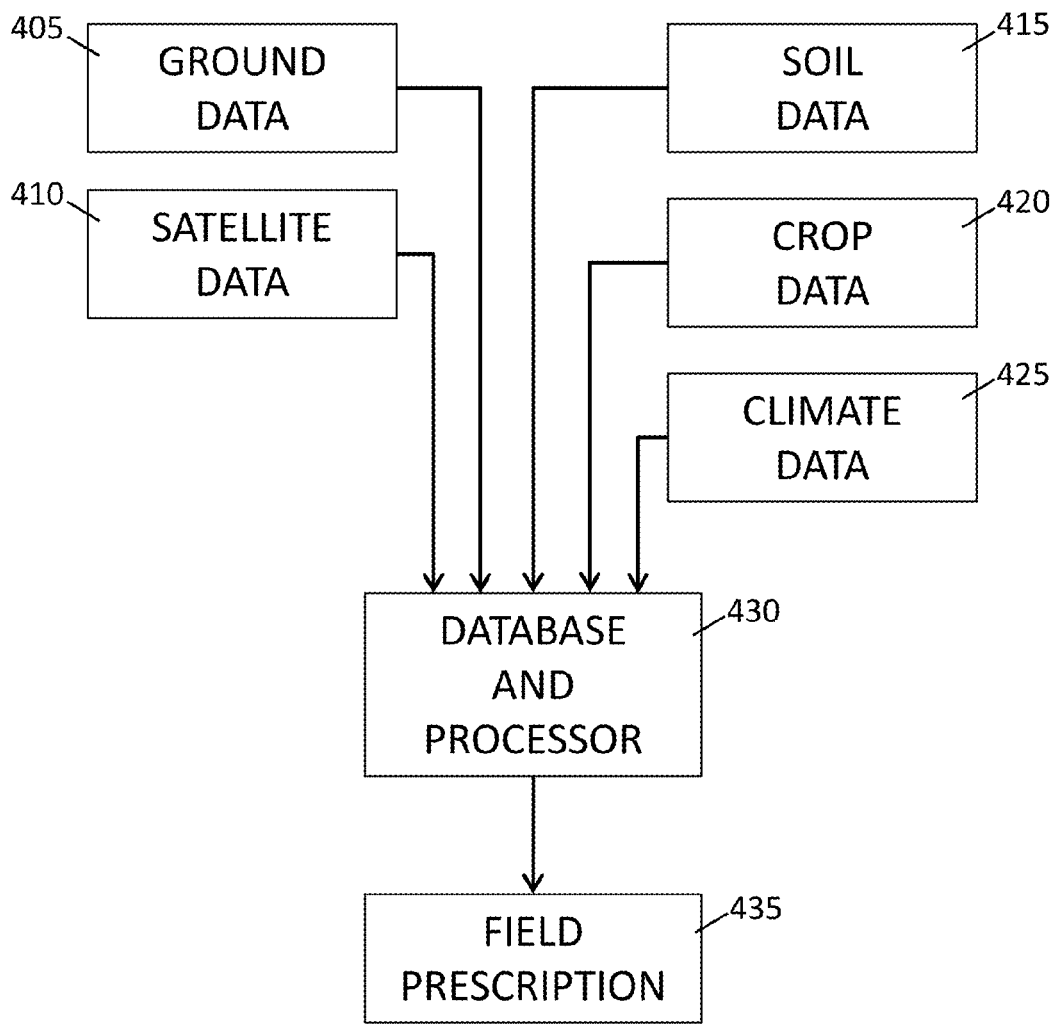
FIG. 4 shows a block diagram of a wide-area field prescription system.

FIG. 4 shows a block diagram of a wide-area field prescription system. In FIG. 4, ground data 405 and satellite data 410 are inputs to a database and processor 430. The output from the database and processor is a field prescription 435; i.e. a plan detailing how much chemical application is needed to optimize yield from a farm field. A field prescription may be visualized as a map showing when, where and how much fertilizer or pesticide is required on a field. The prescription may be used by an automated application system such as a spray truck with dynamically controllable spray nozzles.

Soil data 415, crop data 420 and climate data 425 may also be inputs to the database and processor although not all of these data may be needed for every application. All of the data sources 405 through 425, and other data not shown, are geo-referenced. Each data point (soil type, crop type, climate history, NDVI from various sources, etc.) is associated with a location specified in latitude and longitude or any other convenient mapping coordinate system. The various data may be supplied at different spatial resolution. Climate data, for example, is likely to have lower spatial resolution than soil type.

Data inputs 405 through 425 are familiar to agronomists as inputs to plant yield potential algorithms. Database and processor 430 are thus capable of generating wide-area field prescriptions based on any of several possible plant models and algorithms. The ability to run different hypothetical scenarios offers farmers a powerful tool to assess the risks and rewards of various fertilizer or pesticide application strategies. For example, a farmer might simulate the progress of one of his fields given rainfall and growing degree day scenarios representing average growing conditions and also growing conditions likely to occur only once every ten years. Furthermore, the farmer may send a ground-based NDVI sensor to scan small parts of just a few of his fields frequently, perhaps once a week, for example. These small data collection areas may then be used to calibrate satellite data covering a large farm. The resulting calibrated data provides the farmer with more precise estimates of future chemical needs and reduces crop yield uncertainty.

Figure 5:
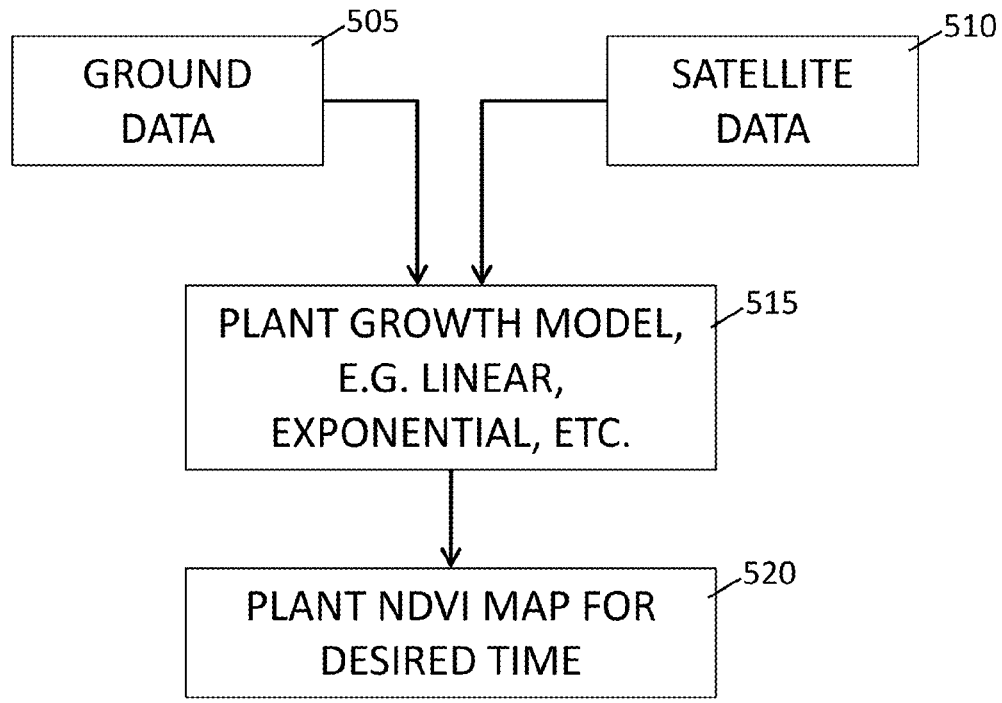
FIG. 5 shows a block diagram of a method to combine satellite and ground data acquired at different times.

It is rarely possible to obtain ground and satellite NDVI data measured at the same time. If only a few days separate the measurements, the resulting errors may be small enough to ignore. However, better results may be obtained by using a plant growth model to propagate data forward or backward in time as needed to compare asynchronous sources. FIG. 5 shows a block diagram of a method to combine satellite and ground data acquired at different times.

In FIG. 5, ground data 505, e.g. NDVI obtained by a GreenSeeker, and satellite data 510 are inputs to a plant growth model 515. Results from the model are used to generate an NDVI map 520 for any desired time. Most plants' growth is described approximately by a sigmoid function; the part of the sigmoid of interest to farmers is the main growth phase which is approximately exponential. Furthermore, for data not separated too far in time, plants' exponential growth may be approximated by a linear growth model.

Figure 6:
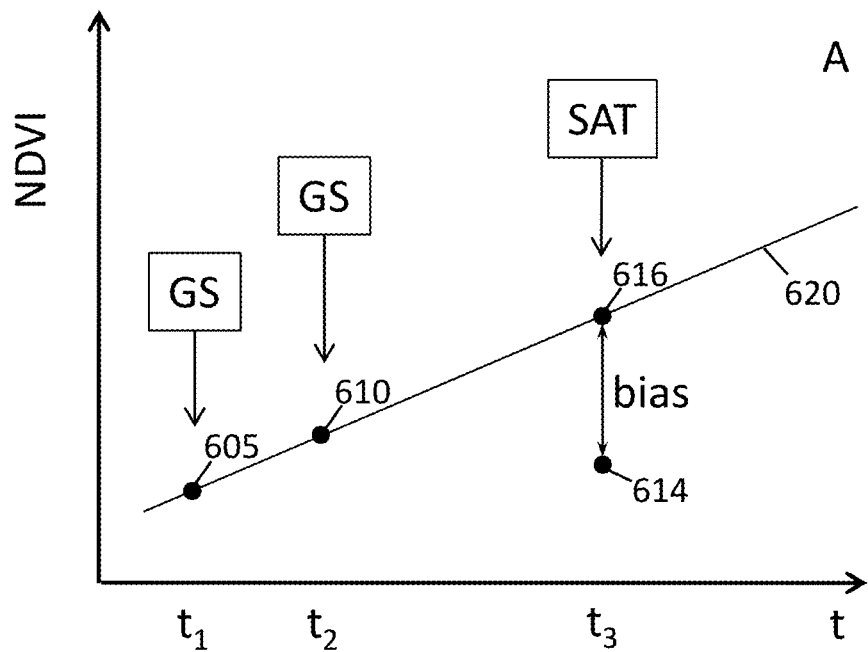
FIGS. 6A and 6B show a schematic graph of NDVI data obtained at different times via different methods.
Figure 6:
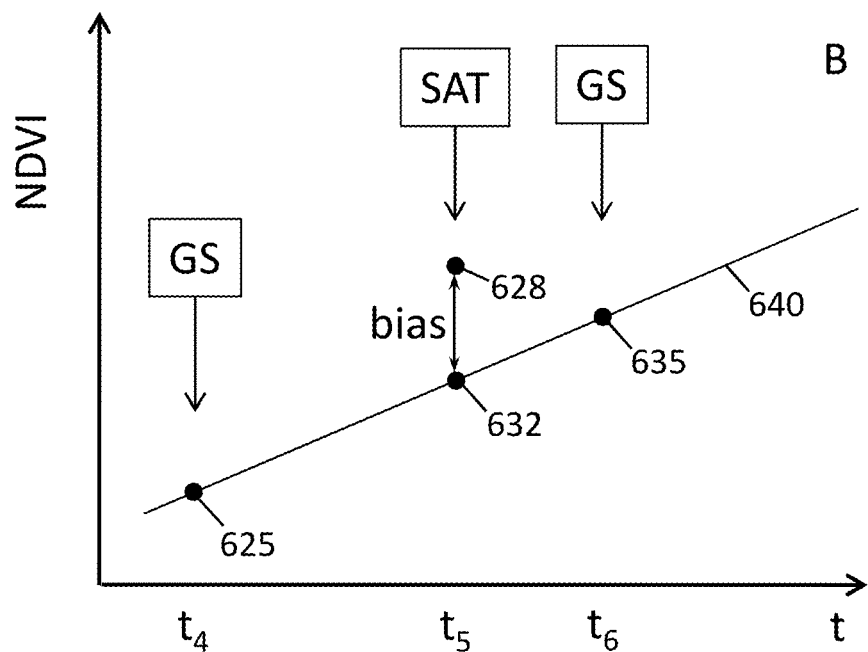

The use of a linear plant growth model to compare asynchronous ground-based and satellite measurements of NDVI may be understood by referring to FIGS. 6A and 6B that show a schematic graph of NDVI data obtained at different times via different methods. In FIG. 6A NDVI is plotted versus time for a small area, for example a single data point in a farm field, or a small section of a field. NDVI measurements 605 and 610 are obtained by a ground-based system at times $t_1$ and $t_2$ respectively, while NDVI measurement 614 is obtained from a satellite image at a later time $t_3$. Satellite-derived data point 614 has a bias or offset. The bias in data point 614 may be calculated by fitting line 620 to ground-derived data points 605 and 610. The result is that the actual NDVI measured by the satellite at time $t_3$ (for the specific ground area under consideration in FIG. 6A) is represented by data point 616, the value of the function represented by line 620 at $t_3$. Of course, the longer the interval between $t_2$ and $t_3$, the less confidence may be placed in linear extrapolation 620. However, the result is likely more accurate than simply forcing data point 614 to have the same value as data point 610, for example.

The situation plotted in FIG. 6B is similar to that of FIG. 6A except for the order in which data is obtained. In FIG. 6B NDVI measurements 625 and 635 are obtained by a ground-based system at times $t_4$ and $t_6$ respectively, while NDVI measurement 628 is obtained from a satellite image at an intermediate time $t_5$. Satellite-derived data point 628 has a bias or offset. The bias in data point 628 may be calculated by fitting line 640 to ground-derived data points 625 and 635. The result is that the actual NDVI measured by the satellite at time $t_5$ (for the specific ground area under consideration in FIG. 6B) is represented by data point 632, the value of the function represented by line 640 at $t_5$.

FIGS. 6A and 6B have been described in a simplified scenario in which plant growth is assumed to be easily modeled as a function of time. However, it may be more realistic to express plant growth as a function of heat input, represented for example by growing degree days since planting. If the number of growing degree days per actual day does not change (an idealized and somewhat unlikely scenario), then plant growth versus time or heat input will have the same functional form. In general, the time axis in FIGS. 6A and 6B may be replaced by a model which may include heat input, moisture, rainfall, sunlight intensity or other data that affect growth rate.

It will be apparent to those skilled in the art that the methods discussed above in connection with FIGS. 5 and 6 may be generalized. Two measurement sources—ground and satellite sensors—measure the same quantity. One source provides absolute measurements while the other includes an unknown bias. A linear model may be used for the time evolution of the measured quantity, NDVI. The situation is well suited for the application of a digital filter, such as a Kalman filter, to obtain an optimal estimate for NDVI. Relative measurements of NDVI over wide areas are calibrated by absolute measurements over smaller, subset areas.

Sparse spatial NDVI sampling may be sufficient to calibrate wide-area satellite data. More dense sampling is needed for smaller management zones which are often associated with more rapidly varying topography, while less dense sampling is sufficient for larger management zones which are often associated with flatter topography.

The wide-area agricultural and prediction systems and methods described herein give farmers more precise and accurate crop information over wider areas than previously possible. This information may be combined with soil, climate, crop and other spatial data to generate field prescriptions using standard or customized algorithms.

Although many of the systems and methods have been described in terms of fertilizer application, the same principles apply to pesticide, herbicide and growth regulator application as well. Although many of the systems and methods have been described as using images obtained from satellites, the same principles apply to images obtained from airplanes, helicopters, balloons, unmanned aerial vehicles (UAVs) and other aerial platforms. Thus "aerial data" comprises data obtained from satellite, airplane, helicopter, balloon and UAV imaging platforms. Similarly, "ground-based data" comprises data obtained from sensors that may be mounted on a truck, tractor or other vehicle, or that may be hand-held. Although many of the systems and methods have been described in terms of NDVI, other reflectance-based vegetative indices may be used.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for calibrating agricultural measurements comprising:
   using an aerial sensor to obtain aerial data representing relative measurements of an agricultural metric in a geographic area, the relative measurements having an unknown bias;
   using a ground-based sensor to obtain ground-based data representing absolute measurements of the agricultural metric within the geographic area; and,
   a processor using the absolute measurements to calibrate the relative measurements, thereby synthesizing absolute measurements of the agricultural metric in parts of the geographic area; wherein,
   synthesizing absolute measurements includes using a plant growth model to propagate ground-based data forward or backward in time as needed to compare it with non-contemporaneous aerial data.

2. The method of claim 1, the aerial data obtained from a satellite.

3. The method of claim 1, the aerial data obtained from an airplane.

4. The method of claim 1, the agricultural metric being normalized difference vegetative index.

5. The method of claim 1, the agricultural metric being a reflectance-based vegetative index.

6. The method of claim 1 further comprising: combining data representing the ground-based and synthesized absolute measurements with additional spatial agricultural data to generate a prescription for the application of chemicals to an agricultural field.

7. The method of claim 6, the additional spatial agricultural data being a soil data map.

8. The method of claim 6, the additional spatial agricultural data being a crop data map.

9. The method of claim 6, the additional spatial agricultural data being climate data.

10. The method of claim 6, the chemicals being fertilizers.

11. The method of claim 6, the chemicals being pesticides or herbicides.

12. The method of claim 6, the prescription based on an agricultural algorithm having an agricultural metric and climate data as inputs.

13. The method of claim 12, the agricultural metric being normalized difference vegetative index and the climate data including growing degree days since planting.

14. The method of claim 1, the plant growth model being a linear model.

15. A system for making calibrated agricultural measurements comprising:
   a source of aerial data representing relative measurements of an agricultural metric in a geographic area, the relative measurements having an unknown bias;
   a source of ground-based data representing absolute measurements of the agricultural metric within the geographic area; and,
   a database and processor that use the absolute measurements to calibrate the relative measurements, thereby synthesizing absolute measurements of the agricultural metric in parts of the geographic area; wherein,
   synthesizing absolute measurements includes using a plant growth model to propagate ground-based data forward or backward in time as needed to compare it with non-contemporaneous aerial data.

16. The system of claim 15, the aerial data obtained from a satellite.

17. The system of claim 15, the aerial data obtained from an airplane.

18. The system of claim 15, the agricultural metric being normalized difference vegetative index.

19. The system of claim 15, the agricultural metric being a reflectance-based vegetative index.

20. The system of claim 15, the database and processor further combining data representing the ground-based and synthesized absolute measurements with additional spatial agricultural data to generate a prescription for the application of chemicals to an agricultural field.

21. The system of claim 15, the additional spatial agricultural data being a soil data map.

22. The system of claim 15, the additional spatial agricultural data being a crop data map.

23. The system of claim 15, the additional spatial agricultural data being climate data.

24. The system of claim 15, the chemicals being fertilizers.

25. The system of claim 15, the chemicals being pesticides or herbicides.

26. The system of claim 15, the prescription based on an agricultural algorithm having an agricultural metric and climate data as inputs.

27. The system of claim 26, the agricultural metric being normalized difference vegetative index and the climate data including growing degree days since planting.

28. The system of claim 15, the plant growth model being a linear model.

* * * * *